United States Patent
Nelson et al.

(10) Patent No.: US 7,512,704 B2
(45) Date of Patent: Mar. 31, 2009

(54) WIRELESS COMPUTER SYSTEM

(75) Inventors: Matt S. Nelson, Madison, AL (US); Everett E. Brooks, Jr., Madison, AL (US)

(73) Assignee: Avocent Corporation, Huntsville, AL (US)

( * ) Notice: Subject to any disclaimer, the term of this patent is extended or adjusted under 35 U.S.C. 154(b) by 762 days.

(21) Appl. No.: 10/815,973

(22) Filed: Apr. 2, 2004

(65) Prior Publication Data
US 2005/0027890 A1    Feb. 3, 2005

Related U.S. Application Data

(60) Provisional application No. 60/459,615, filed on Apr. 3, 2003.

(51) Int. Cl.
*G06F 15/173* (2006.01)
(52) U.S. Cl. ...................................... 709/238
(58) Field of Classification Search ............... 709/238, 709/230
See application file for complete search history.

(56) References Cited

U.S. PATENT DOCUMENTS

| | | | |
|---|---|---|---|
| 5,721,842 A * | 2/1998 | Beasley et al. ............... | 709/204 |
| 5,732,212 A * | 3/1998 | Perholtz et al. .............. | 709/224 |
| 6,418,494 B1 * | 7/2002 | Shatas et al. ................. | 710/305 |
| 6,681,250 B1 * | 1/2004 | Thomas et al. ............... | 709/226 |
| 6,880,002 B2 * | 4/2005 | Hirschfeld et al. ........... | 709/223 |
| 6,915,362 B2 * | 7/2005 | Ramsey et al. ................ | 710/62 |
| 7,209,958 B2 * | 4/2007 | Crookham et al. ........... | 709/217 |

OTHER PUBLICATIONS

CrystalLink Wireless KVM Transmitter & Receiver (Brochure, Mar. 2003).
CrystalLink Wireless KVM Display (Brochure, Mar. 2003).
Presentation: Project: IEEE P802.15 Working Group for Wireless Personal Area Networks (WPANs), Matt Welborn (Xtreme Spectrum) and Kai Siwiak (Time Domain) Mar. 2002.

* cited by examiner

*Primary Examiner*—David Y Eng
(74) *Attorney, Agent, or Firm*—Davidson Berquist Jackson & Gowdey, LLP

(57) ABSTRACT

A system and method of communicating keyboard, video and cursor control (or mouse) data from a plurality of servers to one or more client workstations through one or more keyboard, video, mouse (KVM) switches is disclosed. Wireless communication techniques are used to transmit data between the system components including between the servers and the KVM switches. The servers, which may be blade servers, are typically co-located in single rack environment. Wireless communication techniques may also be used to communicate between the client workstations and the KVM switches.

19 Claims, 16 Drawing Sheets

| INDUSTRY MARKET CONSORTIUM | | WIFI | | | |
|---|---|---|---|---|---|
| IEEE STANDARD | 802.11 | 802.11B | | 802.11A | 802.11G |
| FREQUENCY BAND | 2.4 GHZ | 2.4 GHZ | | 5 GHZ | 2.4 GHZ |
| DATA RATE (MBPS) | 1 TO 2 Mbps | UP TO 22 Mbps | | UP TO 54 Mbps | UP TO 54 Mbps |
| NON-OVERLAPPING CHANNELS | 3 | 3 | | 4 + 4 | 3 |
| MODULATION TYPE | FHSS | DSSS | | OFDM | OFDM |
| BOM COST TO MANUFACTURER | N/A $300 IN 1998 | $25 2004 EST. $20 | | $35 2004 EST. $25 | $35 2004 EST. $25 |
| TYPICAL RANGE | 50 METERS | 50 METERS | | 20 METERS | 50 METERS |
| CURRENT DRAIN (MA) | <350mA | <350mA | | <350mA | <350mA |

FIG. 1

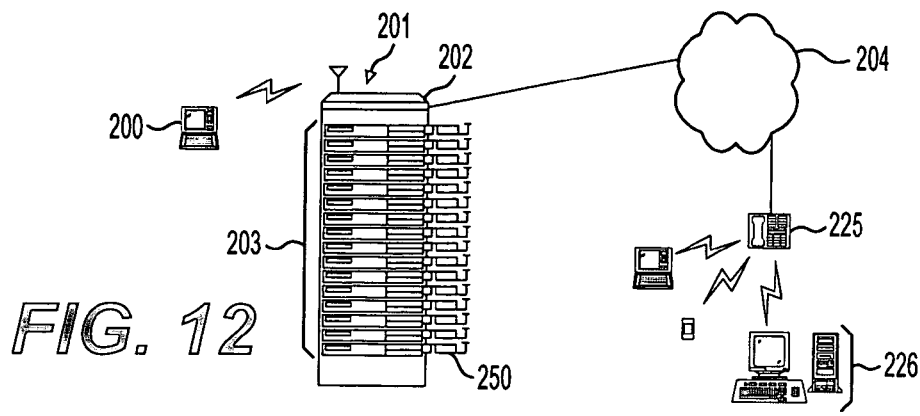
FIG. 12
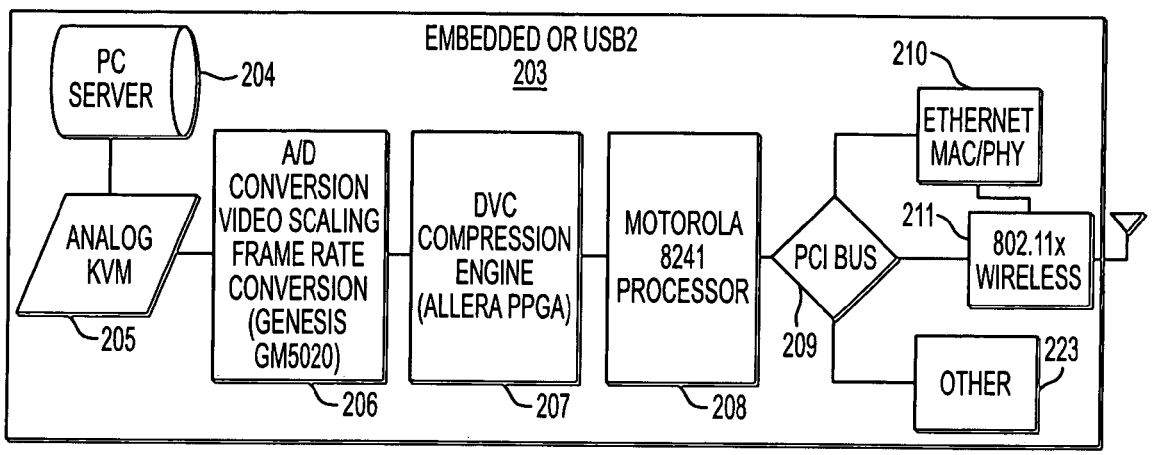
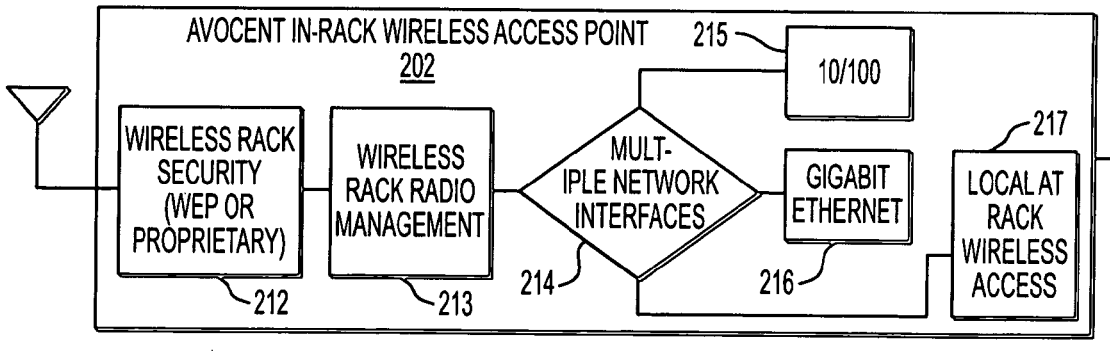
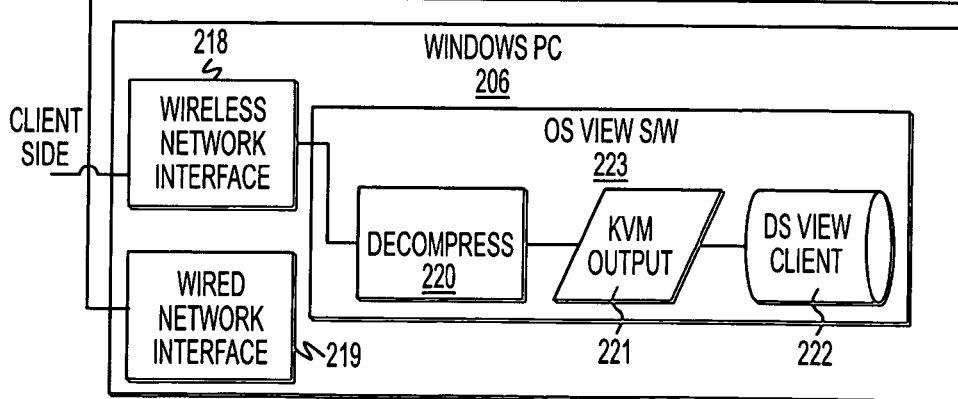
FIG. 13

| Industry Market Consortium | Bluetooth | WiMedia | |
|---|---|---|---|
| IEEE Standard | 802.15.1 | 802.15.3 | SG3a |
| Frequency Band | 2.4 GHz | 2.4 GHz | UWB 2.5 to 10 GHz |
| Data Rate (Mbps) | Up to 1 Mbps | Up to 55 Mbps | 110 Mbps at 10m 200 Mbps at 4m Path to 400 Mbps |
| BOM Cost to Manufacturer | $7-$10 2004 est. $5 | 2004 est. $25 | 2004 est. $30 2005 est. $15 |
| Typical Range | 10 meters | 10 meters | 10 meters |
| Current Drain (mA) | <30mA | <80mA | <150mA |

*FIG. 16*

WIRELESS COMPUTER SYSTEM

RELATED CASES

This patent claims priority from Nelson, et al, U.S. Provisional Patent Application No. 60/459,615, entitled Wireless KVM Server to Switch, filed Apr. 3, 2003.

FIELD OF THE INVENTION

This invention relates to computer networks and more particularly to wireless server control systems.

BACKGROUND AND SUMMARY OF THE INVENTION

In computer networks, clients access and share the services provided by one or more servers. The nomenclature applies when the network is as large as the Internet, where client are computers (for example, personal computers) and the servers are Internet access nodes where data access or other services can be reached. The nomenclature also applies when the network is as small as a few serial device clients communicating with a single computer server, or in a corporate network where employee computers communicate with a rack of servers.

In the server rack environment, a number of servers are stacked (literally mounted) in a rack within a convenient central location. From that location, networking capabilities are provided between the various servers in the rack and the clients that are eligible to use their services. A common connection technique today is Ethernet connection or other connection by traditional ports and cables, such as CAT 5 type cables, also may be employed. At the central location, computer technicians can obtain ready access to all of the physical servers, and perhaps even more importantly, can control the environmental conditions (such as ambient temperature) where the servers operate. For that reason, and other reasons of practicality, most corporate networks now employ racks of servers communicating with the various computers employed by the corporation. A server rack can contain many servers, and in the case of so-called blade servers (for example, servers without surrounding independent boxes), it is possible for many hundreds or thousands of blades to employed in a common rack.

When the network is designed for personal computing, the servers operate (in a simplified manner) by receiving keyboard and mouse signal provided from a client, processing those signals using the application(s) resident on the server, creating a video signal based on the signals and application, and transmitting the video signal back to the client for display at the client workstation. In that way, a client user can communicate with a server to employ the server's services using inputs from the client and receive back the appropriate video information resulting from the client request and server response. In the past, such keyboard, mouse, and video transmissions required a tremendous amount of cabling together with intelligent switching to ensure that the client could communicate with a selected one of the servers in the server rack.

Such keyboard, mouse and video switching is described in U.S. Pat. No. 5,721,842, entitled Interconnection System for Viewing and Controlling Remotely Connected Computers with On-Screen Video Overlay for Controlling of the Interconnection Switch, which is incorporated herein by reference in its entirety. An alternative method and apparatus for transmitting keyboard and mouse signals from a client to server is described in U.S. Pat. No. 5,732,212, entitled System and Method for Remote Monitoring and Operation of Personal Computers, which is also incorporated herein by reference in its entirety. Many variations exist in the manner and protocol employed in communicating the keyboard and mouse signals between the client and the server. Also, different alternative embodiments exist in which the keyboard, mouse and video signals are switched between a selected client and/or a selected server. The details of such variations in manner/protocol and in switching systems are known in the art, are at least in part described in the above-incorporated patents, and for sake of brevity will not be repeated herein.

Server rack systems, the cabling issues that attend to such systems, and methods of addressing such cabling issues are described in U.S. patent application Ser. No. 09/951,774, entitled Passive Video Multiplexing Method and Apparatus, which is also incorporated herein by reference in its entirety. As described in greater detail in the '774 application, the rear view of a rack full of servers can appear as a tangle of cables with each server requiring at least two cables—even in low-cable embodiments. With a rack of hundreds, and potentially thousands of servers, even those low-cable systems employ enormous mazes of cable.

FIG. 2 illustrates a prior art system in which eight workstations 20 are connected by a set of KVM switches 21 to sixty available servers 22. In the example embodiment, the KVM switches could be the so-called "XP" series switches manufactured by Avocent of Huntsville, Ala. In such switches, workstation cards (identified in FIG. 2 as XPDU cards and one of which is identified as card 23) provide switch access points for workstations 20 to a backplane in the respective switches 21. Similarly, server cards (identified in FIG. 2 as XPAC cards and one of which is identified as card 24) provide switch access points for servers 22 to a backplane in the respective switches 21. The switches communicate information on their respective backplanes between themselves by switch receive cards (XPSR, for example, card 25) and switch transmit cards (XPST, for example, card 26). Keyboard and mouse signals that originate at the workstations 20 are communicated to the servers through the switches via switch paths created by the XPDU, XPSR, XPST, and XPAC cards as they cooperate with the backplane controllers within the respective switches 21. Similarly, video signals that originate at the servers in response to the keyboard and mouse signals are communicated back to the workstations through a similarly established switch path.

In the example of FIG. 2, sixty KVM cables (usually having at one end a keyboard cable, mouse cable and video ports to communicate with corresponding ports on the server and at the other end a standard or proprietary connector to communicate with the KVM switch) are required to connect the XPAC cards to corresponding ones of the sixty servers. Eight more KVM cables are required to connect the XPDU cards to corresponding ones of the eight workstations (in addition to cables, such as network cables, etc. connected to the workstation). Finally, 192 cables (such as CAT 5 type or other suitable cable) interconnect the switches to establish the respective switch paths for the workstations 20 to access any of the servers 22. The total count of cable for the example embodiment of FIG. 2 is 260 cables, the cumulative effect of which is shown in FIG. 3.

FIG. 4 is a prior art modification of the system of FIG. 2 in which cabling is reduced by the inclusion of a multiplexing hub. In FIG. 4, twice as many workstations 20 (sixteen) switch to the same sixty servers 22 via XP switches 21. However, in the embodiment of FIG. 4, the middle layer of XP switches seen in FIG. 2 is replaced by the multiplexing hub 25, which may be, for example, the XP4400 hub manufactured by Avocent. The multiplexing hub 25 coordinates communication between the switches 21 that directly connect to respective servers and workstation, thus eliminating a substantial amount of infrastructure cabling. As shown, the system as a whole still requires sixty KVM cables for the servers. Sixteen cables are added to the workstations. Eighty cables connect the hub 25 to the switches 21. The total count of cable for the example embodiment of FIG. 4 is 156 cables. The cumulative effect of the cable count is shown in FIG. 5, which still shows a tangle of cables, but of much less volume than that shown in FIG. 3.

FIG. 6 provides the next cable-reducing improvement in the prior art KVM switch environment. In FIG. 6, the servers are connected to digital KVM switches 27, such as the DSR series of switches manufactured by Avocent. In the example embodiment, keyboard, mouse and video all travel on a CAT 5, or other suitable, cable from the server 22 to the digital switch 27. The digital switch packets the keyboard, the mouse, and a digitized version of the video for transmission via network 26 to the workstations 20. The workstations 20 require no additional cabling beyond that already found in the standard workstation (assuming, as in the above embodiments of FIGS. 2 and 4 that the workstations already include network connections). The type of network 26 and the network protocol used is not limiting. In the embodiment of FIG. 6, added system cable includes only sixty cables from the servers to the digital switch 27 and four cables from the digital switch 27 to the network 26. The total cable count in FIG. 6 is 64.

As shown by the progression of prior work done to reduce cabling requirements in KVM switch environments, an effective wireless system would provide substantial advantage in reducing cabling complexity within the rack. But, standard wireless technology does not yet provide the requisite performance criteria needed to simply substitute wireless transmitter/receiver combos wherever a wire now exists in the client and server architecture. One cannot simply decide to remove the sixty cables from the servers in the embodiment of FIG. 6 and substitute wireless transmitters and receivers for them because the performance requirements in the KVM environment and the performance provisions by standard wireless systems do not match. Even in the wire-line environment, communicating video signals from the servers to the clients has posed particularly troubling issues. Uncompressed video information from a server can, depending on resolution and refresh rates, amount to 60 million or more pixel values per second being communicated from the server to the client. Bandwidth requirements for that kind of data volume can be prohibitively high, even for most wire-line systems much less wireless ones. Some traditional video compression techniques, such as the JPEG and MPEG variations, require substantial processor capabilities or remain too slow for the KVM system arts, where even relatively small delay times between keyboard/mouse input from the client and video response from the server will frustrate client users.

One method of addressing video transmission from a rack of servers to a client is described in U.S. Pat. No. 6,418,494, entitled Split Computer Architecture to Separate User and Processor While Retaining Original User Interface, which is also incorporated herein in its entirety. In the '494 patent, video information is communicated from bus to bus, in one example embodiment from PCI bus to PCI bus. In that embodiment, the PCI bus data requires a substantially smaller bandwidth than does the raw video data. Such a system has particular usefulness in server rack environments where the video transmissions can be made as PCI bus data rather than as raw video data so the communication channel can provide lower bandwidths while maintaining acceptable keyboard/mouse to video signal synchronization.

Another method of addressing video transmission issues is described in U.S. patent application Ser. No. 10/260,534, entitled Video Compression System (the Dambrackas application), which is also incorporated herein by reference in its entirety. In there, video is compressed in a manner that is particularly suited to computers, namely by strategically choosing between various combinations of commands. In one embodiment, the command choices include (a) one from a set of run-length commands in which pixels are identified by reference to a known pixel value of predetermined positional relationship to a current pixel, (b) a make-series command in which pixels are identified by a binary bit value corresponding to one of two known colors, and (c) a make-pixel command in which a single pixel value is identified by traditional 15-bit color encoding (or other such suitable per-pixel encoding).

More particularly, the above-described Dambrackas algorithm receives a continuous string of pixels, which are encoded by a strategic selection of pixel encoding techniques that optimize encoding based on characteristics that are unique to computer video. First, whenever a portion of the string of pixels can be run-length encoded using a copy command from a known pixel to the left of the first pixel in the string portion, above the first pixel, or in the same x-y location as the first pixel but in a prior frame, the algorithm encodes the string into one or more bytes having a header identifying the type of run-length command and the length of the run. Second, when run-length encoding does not apply to a string portion, the algorithm determines whether the string portion consists of only two colors. If so, the two colors are identified (either independently or by reference to known pixel colors) and then one or more bytes are identified with a payload of binary bit values corresponding in order and value to the string portion of two colors. In that way, the bytes represent bit-coordinated encoding of two-color strings. That particular two-color string encoding develops great efficiency in the encoding because two-color strings tend to disrupt run-lengths, but are frequently found in computer video where two-color text (foreground and background) can predominate.

Of course, other video compression techniques are known and will become known. The present invention is not generally limited to the Dambrackas algorithm (except where the claims so require an algorithm like it), although it supports the first entry into a viable wireless KVM switching system. The Dambrackas application thus has usefulness in the server rack environment where video data from the selected server can be communicated with no loss in video information, with exceptional compression, and with undetectable lag between keyboard/mouse inputs at the client and video response from the server.

Using compression technologies that are particularly suited to computer video, such as those described in the Dambrackas application, sufficient compression efficiency can now be realized to permit a wireless protocol within the server rack system. Wireless-systems are already incorporated into LANs such that clients and servers can exchange packet data between themselves, but wireless technology has been elusive in the sever rack environment where the bandwidth and keyboard/mouse/video synchronization requirements have provided obstacles to the effectiveness of wireless embodiments. The present inventors have solved the problems particular to wireless connectivity in the KVM switch environment by applying suitable video protocols, especially those tailored to computer technology, to reduce the lag time between keyboard/mouse inputs from the client and video responses from the wireless server.

Example wireless protocols, such as IEEE 802.11 can be employed within the server rack environment to eliminate much of the cabling required by wireline rack systems. In fact, using known wireless protocols in the server rack could have provided a wireless solution much earlier but for the unique problem in the server environment where the responsiveness of the server video to the keyboard/mouse entries affects the user's experience at the workstation. Thus, while keyboard and mouse data (with low bandwidth requirements) and various commands (such as application commands) could be easily communicated by wireless protocol using existing techniques, KVM switches and server racks remained wired so the real-time video signals could be timely communicated.

The algorithms described in the Dambrackas application provide an excellent video compression routine to permit the KVM switches and server racks to be converted from a wired scheme to a wireless one.

The IEEE 802.11 specification is a wireless LAN standard developed by the members of the IEEE committee in order to specify an over-the-air interface between a wireless client and a base station, access point, or client. The initial 802.11 standard was finalized in June 1997. It specifies a 2.4 GHz operating frequency using frequency hopping spread spectrum (FHSS) or direct sequence modulation with data rates of 1 to 2 Mbps. Later, the 802.11b, or "high rate," standard was adopted, which provided data rates of 11 Mbps. The standard's 11 Mbps PHY layer uses Complementary Code Keying (CCK) technology. This standard is based on Direct Sequence Spread Spectrum (DSSS) technology and provides speeds of up to 11 Mbps with fallback rates of 5.5 Mbps, 2 Mbps, and 1 Mbps. The need for even higher rates led to the development of the 802.11a standard, which supports data rates of up to 54 Mbps. Like Ethernet and Fast Ethernet, 802.11b and 802.11a use an identical Media Access Control (MAC). 802.11b technology is the first technology to obtain the same level of performance in the wireless environment as the wired standard 10BaseT Ethernet. 802.11g is a backward compatible extension to 802.11b and will broaden 802.11b's data rates to 54 Mbps, like that of 802.11a. 802.11g operates in the 2.4 GHz band using orthogonal frequency division multiplexing.

Many other 802.11x standards have been evaluated, implemented, and proposed. The following description is meant to provide a suitable background to understand how some of the 802.11 standards can be made compatible with KVM switches and server racks after the video information is treated. This discussion of 802 standards is not meant to limit the present invention in any way, but merely serves to lay a background for how the problem of incorporating wireless services into KVM switches is now made possible by the synergy of wireless bandwidth availability together with favorable video data compression techniques.

802.11b operates in the 2.4 GHz ISM band. It occupies 83.5 MHz (for North America) from 2.4000 GHz to 2.4835 GHz. It provides 11 channels (for North America), each channel being 22 MHz in width, and each channel centered at 5 MHz intervals beginning at 2.412 GHz and ending at 2.462 GHz. There are only three channels that do not overlap (channels 1, 6 and 11).

802.11a operates in the 5 GHz UNII (Unlicensed National Information Infrastructure) band. It occupies in 300 MHz divided into three different bandwidths of 100 MHz each, including: 5.15 to 5.25 GHz (U-NII lower band), 5.25 to 5.35 GHz (U-NII middle band), and 5.725 to 5.825 GHz (U-NII upper band). It provides 12 channels, each channel being 20 MHz in width, beginning at 5.180 GHz and ending at 5.320 GHz for the lower and middle U-NII bands, and beginning at 5.745 GHz and ending at 5.805 GHz for the upper U-NII bands. None of the 802.11a channel overlap. 802.11a defines a total of eight non-overlapping 20 MHz channels across the two lower bands and four non-overlapping 20 MHz channels across the upper band. Each of these channels is further divided into 52 sub-carriers each occupying approximately 300 KHz of bandwidth. Four of the 52 are pilot tones used in the coherent demodulation of the complex transmitted signal at the receiver, and do not carry data—leaving 48 of the sub-carriers to carry user information.

Further background information regarding the current 802.11 standards is shown in FIG. 1.

The 802.11 standards can be applied to KVM switches and server racks at various locations throughout the switching systems to reduce or eliminate cabling in those locations. But, 802.11 cannot alone handle raw video information while maintaining sufficient real-time video/mouse synchronization mandated by the KVM environment. A highly efficient video compression algorithm that takes advantage of compression-friendly characteristics unique to computer video allows 802.11 standards to become appropriate for the bandwidth intensive, real-time environment of KVM switching.

Another aspect of the system can include the use of Ultra Wide Band (UWB) wireless technologies to communicate between system components. UWB is a pulse-based radio technology, as opposed to all other WLAN systems, which operate with a continuous RF since wave signal. UWB uses various combinations of time, coding, amplitude and frequency to allow it to transmit data in large bursts. Because it transmits for only extremely short periods that do not last long enough to cause interference with other signals, UWB can share frequencies that are used by other applications. UWB uses very low power RF signals which take advantage of a large swath of spectrum that is multiple GHz wide. Because UWB uses pulsed signals, UWB can be implemented in many alternative ways ranging from time modulation on a signal pulse to coded strings of pulsed signals.

The spectrum for UWB ranges from 2.5 GHz to 10 GHz with emitted RF power at the FCC part 15 level. FCC part 15 is defined as an amount of unintentional RF emissions. Essentially, this means that UWB signals have an amplitude that would not exceed the ambient noise floor.

Certain aspects of UWB are currently being defined by the IEEE organization and interested companies. One of those aspects is channelization. It is anticipated that a channelization matrix will be defined to allow for multiple combinations of UWB radio links, ranging from a single, very high data rate channel down to many lower data rate channels.

Additionally, signal security in wireless networks is increased when using UWB. The RF signals UWB utilizes travel in the same frequency range as other electronic devices, making the signal appear very noise-like. Further security comes from the various coding schemes involved in UWB and the extremely low emitted power. Because of the low emitted power levels, UWB signals may be effectively transmitted no more than 10 meters. Additionally, because of the ability to measure the time of flight of a single pulse, a system utilizing physical distance gating of UWB signals can be developed and implemented. Therefore, the use of UWB would allow for the transmission of large amounts of data coupled with a high degree of network security.

BRIEF DESCRIPTION OF THE FIGURES

FIG. 1 is table of prior art 802.11 standard characteristics;

FIGS. 12 and 13 are another example embodiment of an end-to-end wireless KVM solution;

FIG. 16 is a table showing three different radio transmission methods' standard characteristics.

DETAILED DESCRIPTION OF THE PRESENTLY PREFERRED EMBODIMENT

Figure 2:
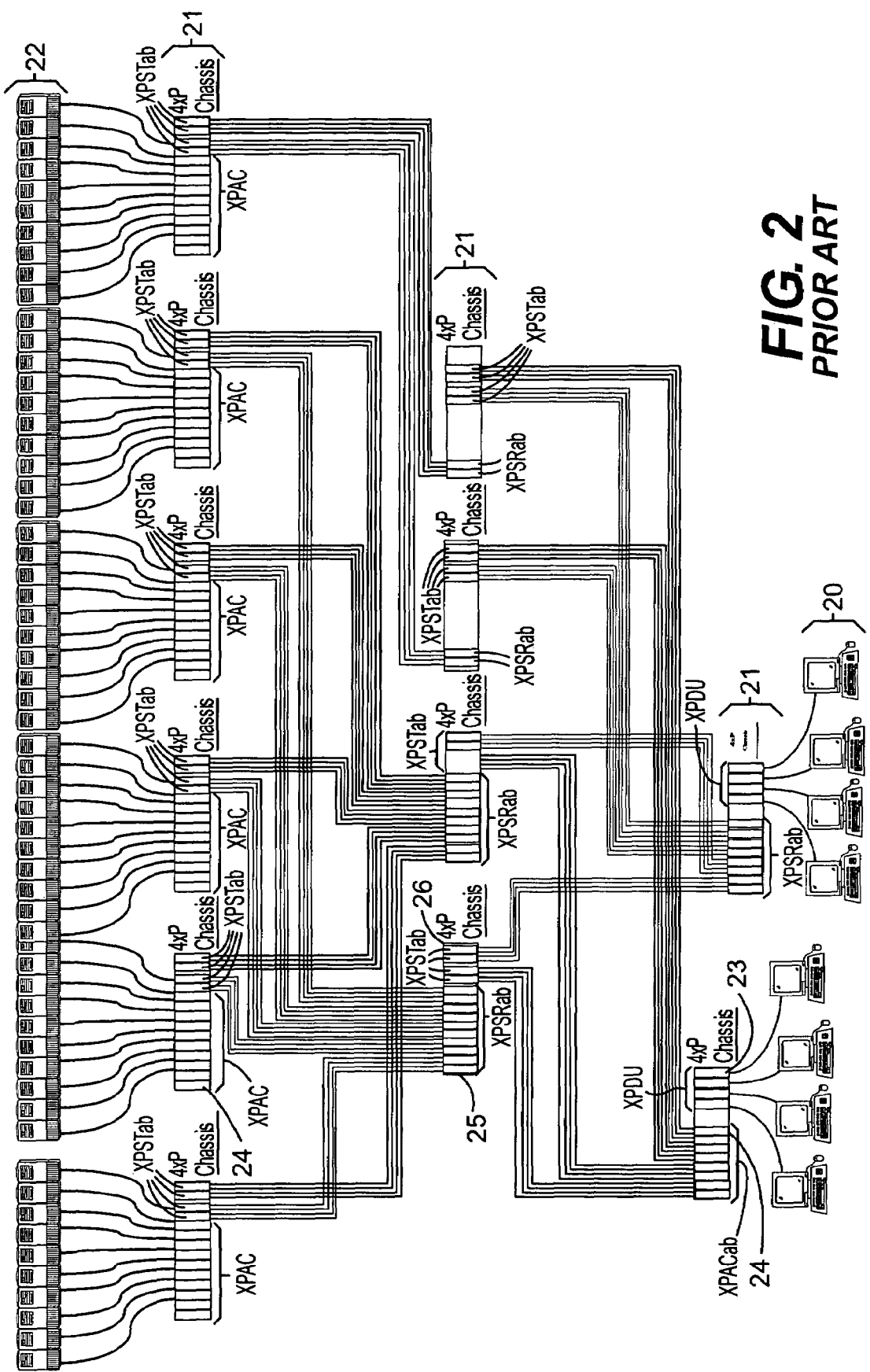
FIG. 2 is a schematic diagram of a traditional 8×60 KVM switch system.
Figure 3:
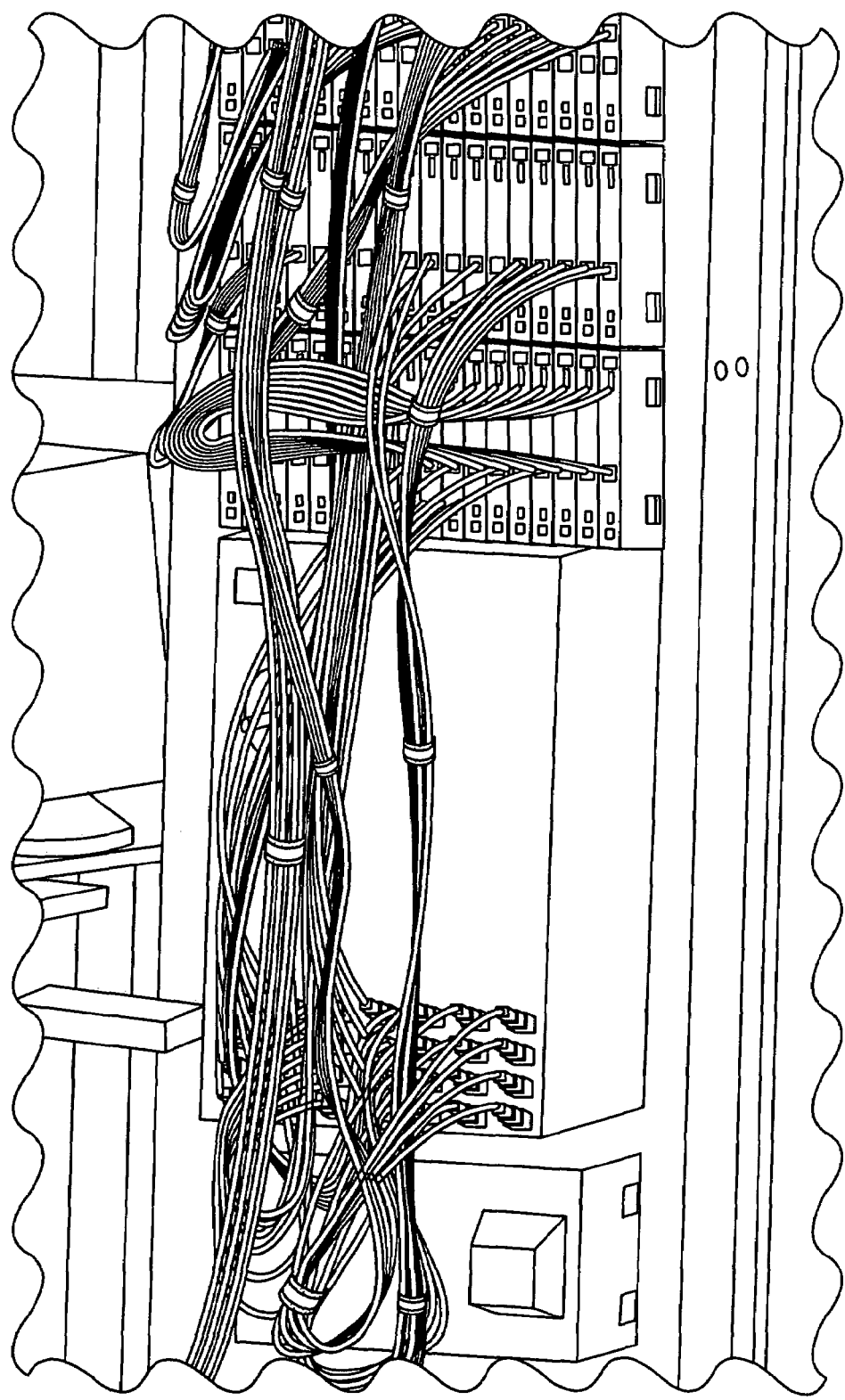
FIG. 3 is representation of the cabling required for the embodiment of FIG. 2.
Figure 4:
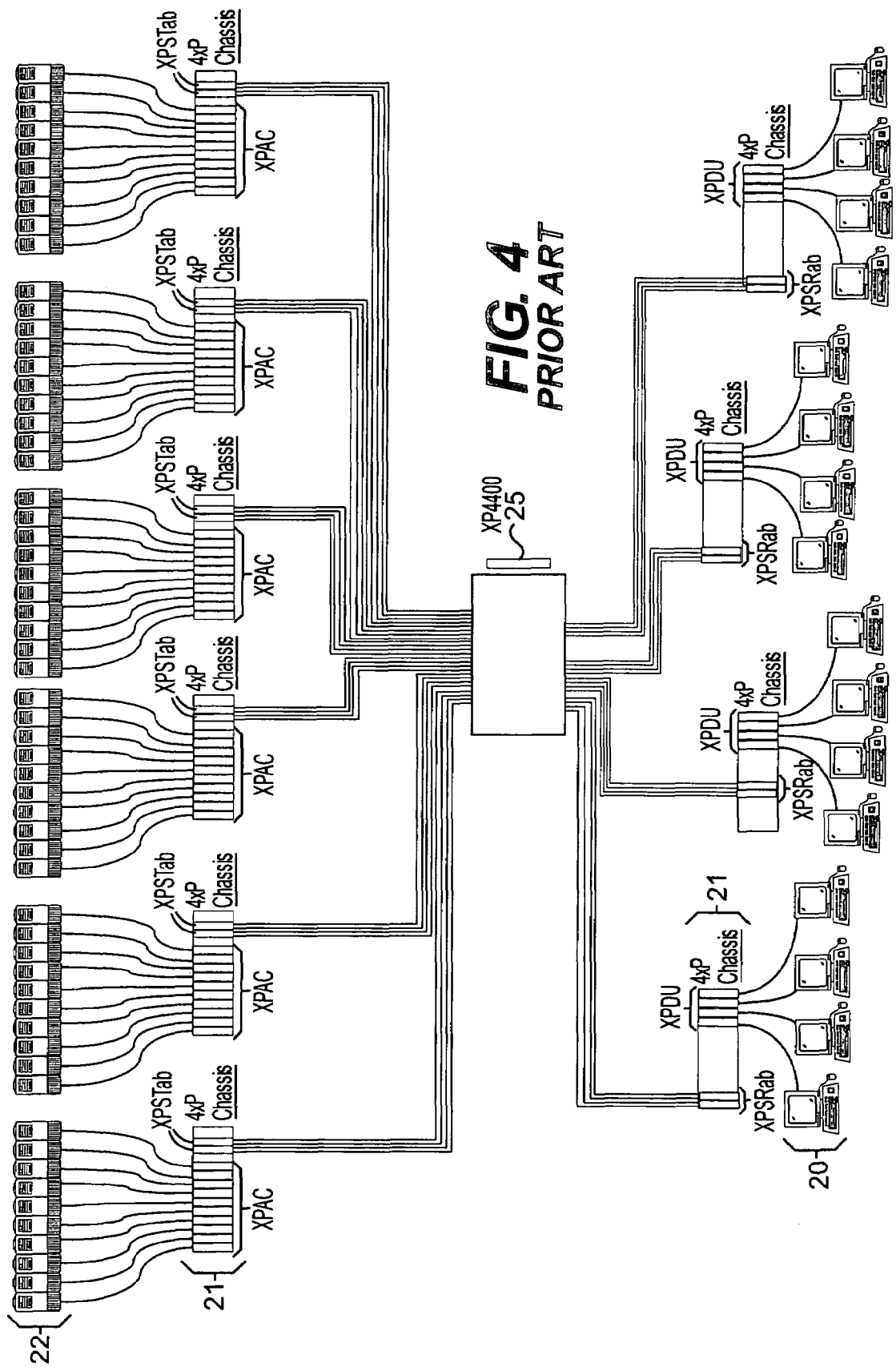
FIG. 4 is a schematic diagram of a traditional 16×60 KVM switch system with a multiplexing hub.
Figure 5:
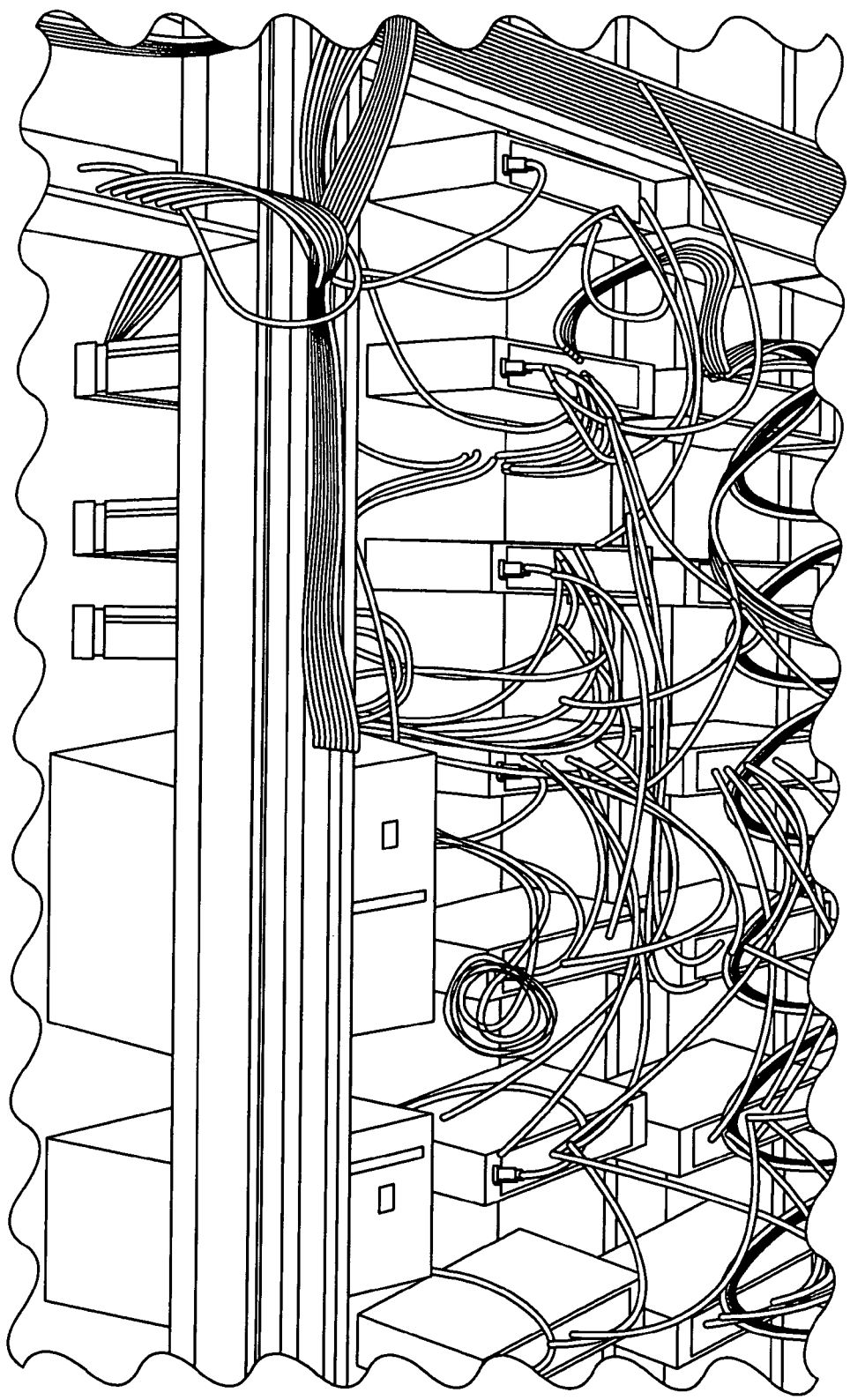
FIG. 5 is a representation of the cabling required for the embodiment of FIG. 4.
Figure 6:
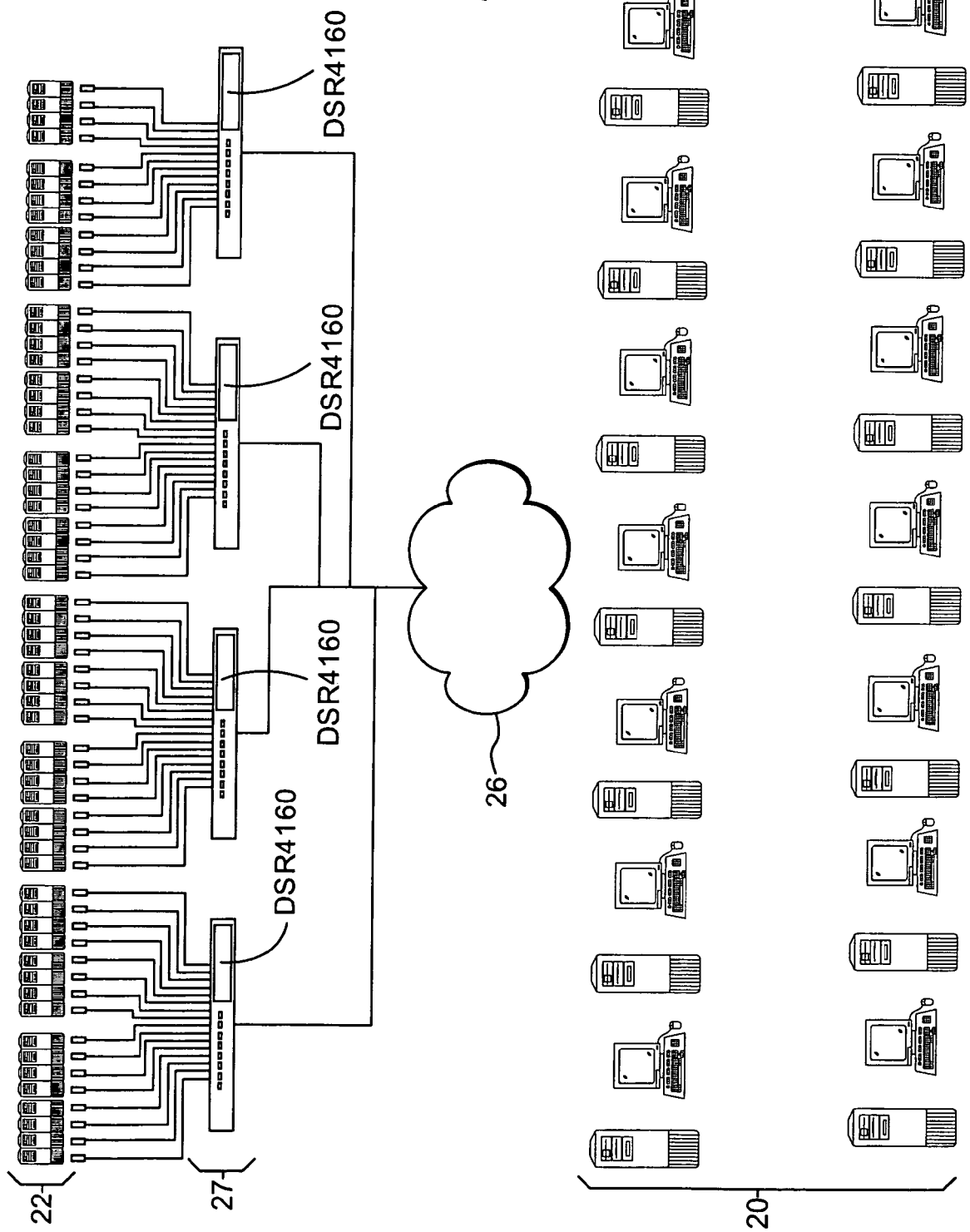
FIG. 6 is a schematic diagram of a traditional 16×60 digital KVM switch system.
Figure 7:
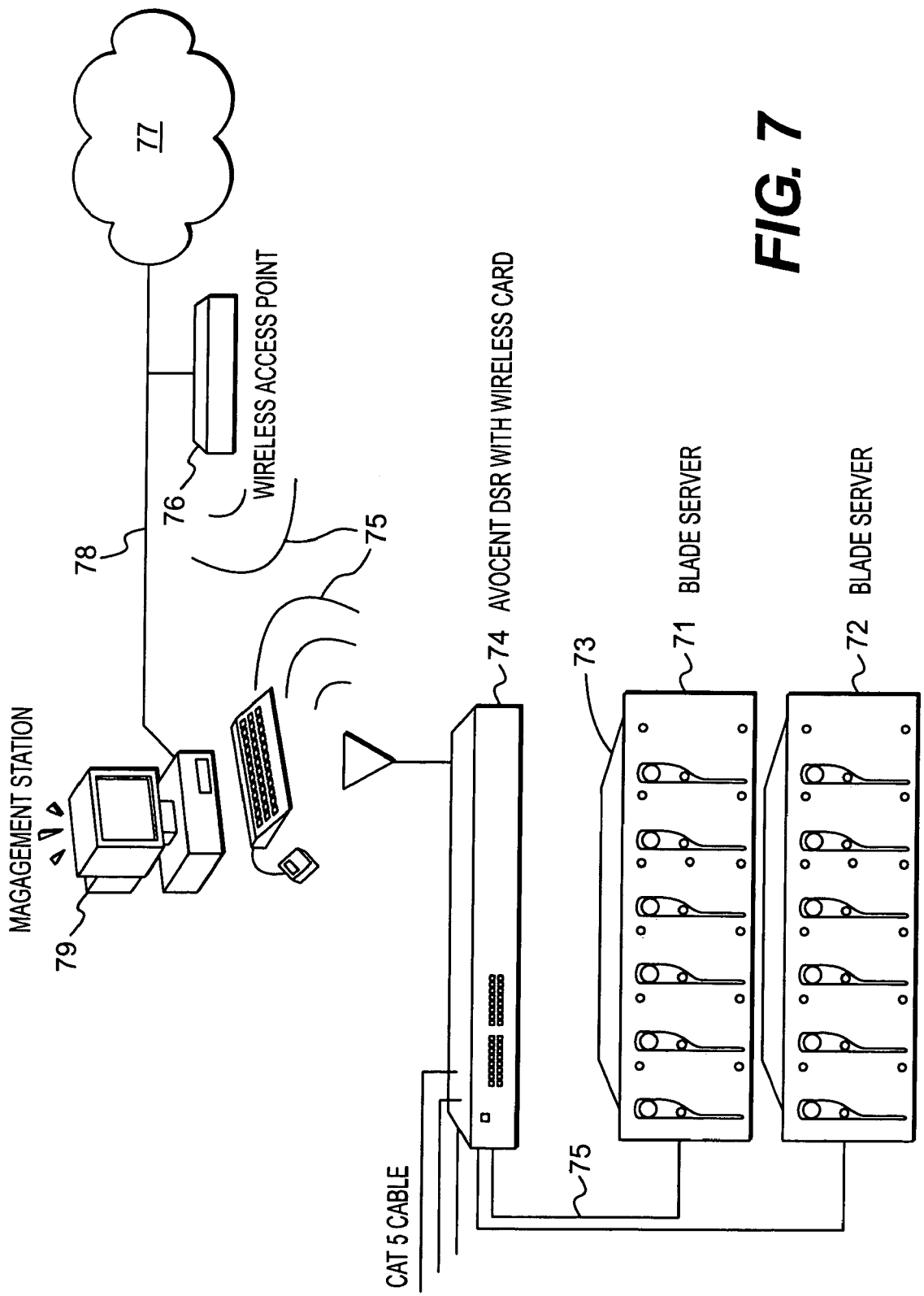
FIG. 7 is a schematic diagram of an example embodiment of a wireless switch to network connection within a KVM switch system.
Figure 8:
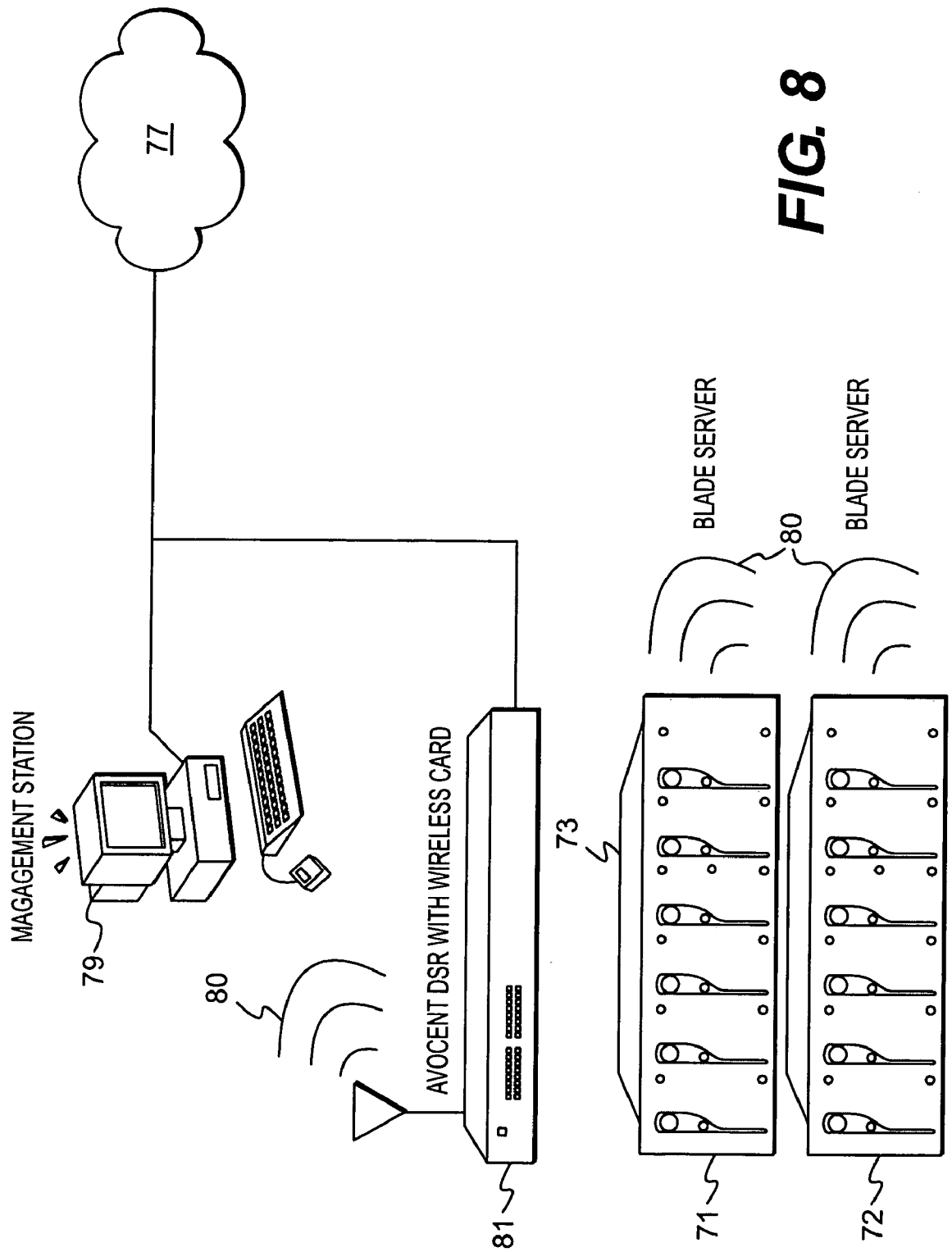
FIG. 8 is a schematic diagram of an example embodiment of a wireless server to switch connection within a KVM switch system.
Figure 9:
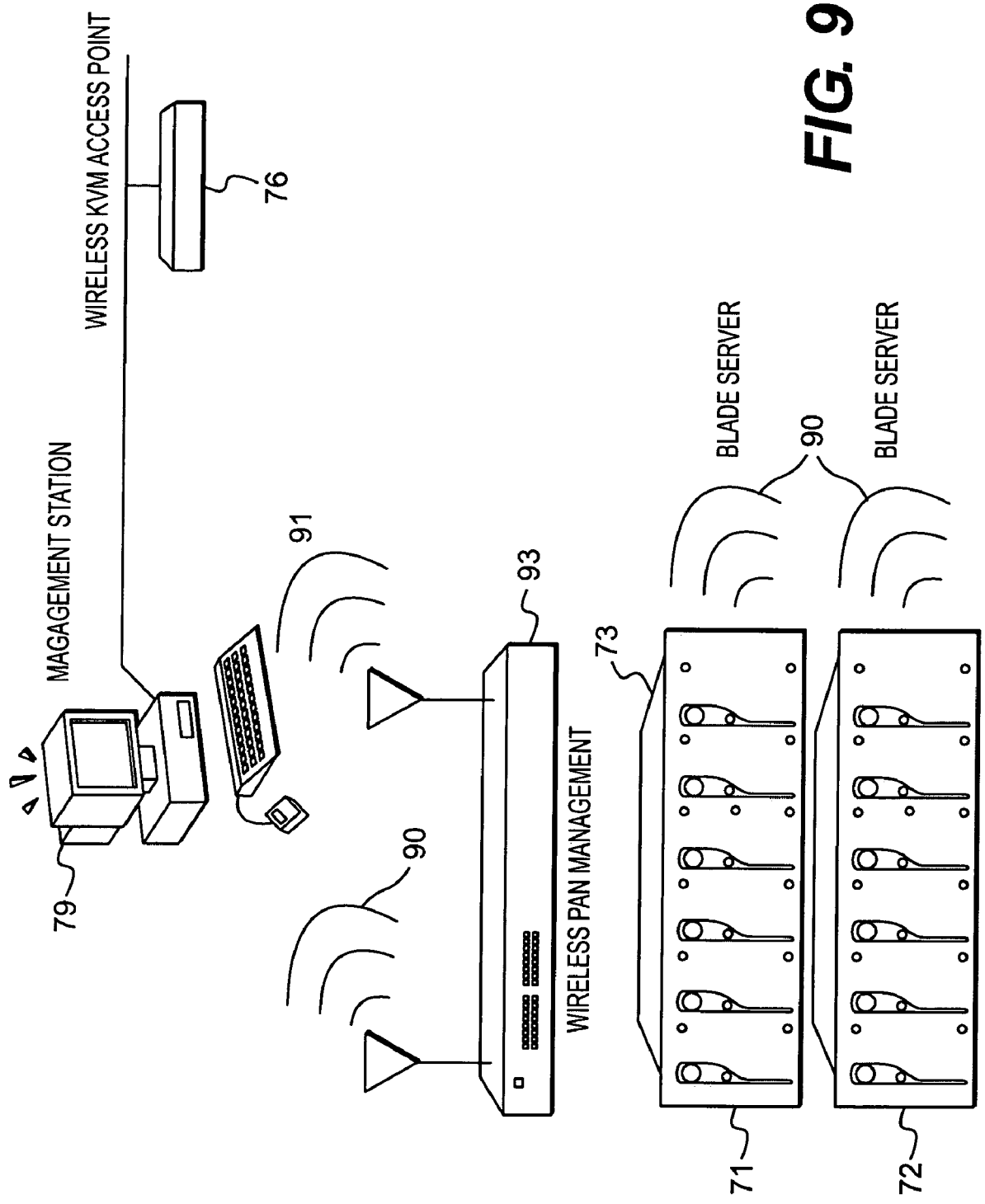
FIG. 9 is a schematic diagram of an example embodiment of a wireless end to end solution within a KVM switch system.

Wireless connectivity in a KVM switch environment can be broken into several aspects of KVM switch system communication. In FIG. 7, the simplest wireless implementation into the KVM environment provides a wireless management station with "crash cart" connectivity between the workstation and the digital switch. The switch remains wired to the various servers, as shown in FIG. 6. In FIG. 8, the management station remains wired to the digital switch and the wireless connectivity is provided between the digital switch and the servers in the server rack. The embodiment of FIG. 8 poses new problems over the embodiment of FIG. 7 in that channelization issues become relevant as the switch communicates wirelessly to multiple servers, sometimes simultaneously. Finally, FIG. 9 illustrates an end-to-end wireless solution in which a private area network manager coordinates wireless communication from management station to switch and from switch to servers.

Beginning with FIG. 7, standard racks 71 and 72 of blade servers 73, etc. provide independent computer processing capabilities. Although in no way limiting the present invention, an example of such a system can involve assigning a blade server to each user in a corporate environment, such that each user can access his or her own computer (i.e., blade) located in a centrally located rack. Other embodiments may have ranks of servers providing Internet web material, common corporate information such as accounting systems, document servers, mail servers, etc., or any other collection of servers co-located in a common rack. The servers need not be particularly, blade servers, but may be 1 U rack-mounted servers, or may be a collection of co-located but un-racked servers. Thus, the particular server type or environment does not limit the present invention.

Servers typically include, as a minimum, a general-purpose processor, memory containing some type of application program, and ports to receive user input information and output computer video information. In KVM switch environments, the user input information can be provided from a remote location, to which the resultant computer video must also be transmitted for display on the workstation monitor. With modem server speeds, server-induced lag between receipt of the user input information and the creation of resultant computer video is minimal. When the mouse/keyboard signals lag the server in a KVM environment, it is usually a result of the KVM infrastructure. Even very slight lag time between the user's actual hitting of the keyboard, moving of the mouse, etc. and the display of the server's video response at the user's monitor will cause a computer user to become frustrated. In the KVM switch environment, the infrastructure between the workstation and the server must not impose unacceptable delay between transmission of the keyboard/mouse information and transmission of the resultant video response.

In FIG. 7, the server racks 71 and 72 with the servers 73 communicate via wire-line 75 (such as CAT 5 type cable shown) to the digital switch 74. With the exception of the wireless hardware, software, and protocol aspects of FIG. 7, the arrangement of FIG. 7 is similar in operation to the arrangement of FIG. 6. The digital switch 74 may receive keyboard/mouse information from workstations (such as those shown in FIG. 6) via wire-lines. In such cases, the KVM information is communicated from/to the workstations and serves via the digital switch 74 consistent with the operation of the DSR-type products offered by Avocent. The digital switch 74 receives packeted keyboard/mouse information from a workstation via a network, unpacks the raw keyboard and mouse information and supplies it to the appropriately selected server 73 in the server racks 71/72. The selected server receives the keyboard/mouse information at its keyboard/mouse ports, performs code operations in the general purpose processor using the application programs, and returns a responsive video signal to the workstation via the switch 74.

In some instances, errors or failures occur in one of the blade servers, or some form of monitoring or maintenance must be performed on one of the blade servers. In prior systems, network administrators could communicate by network or by hard wire hookup through the digital switch to the affected server. The switch permitted the administrator to make keyboard/mouse inputs at the selected server and to receive the video output from it. In the embodiment of FIG. 7, the management station 79, which in the preferred embodiment is a computer on a mobile cart, a laptop, a personal assistant, or other mobile processing device, is either wired to a wireless access point 76, or includes a wireless access point 76 within the structure of the management station 79. The wireless access point 76 operates according to one of the IEE 802.11 standard protocols, other some other suitable wireless protocol, to communicate signals 75 with the digital switch 74. The digital switch 74 includes a wireless card to transmit and receive the wireless communications 75 from/to the wireless access point 76.

With the wireless connectivity, the network administrator can wheel or carry the management station 79 through the central computer facility and communicate instantly with any of the digital switches 74 (and hence to any of the servers in the server racks) located anywhere within the computer facility. Whereas now, to gain the same switch access, the administrator must move the management station, connect its KVM wire-lines to the local ports of the digital switch 74, perform the necessary functions, unconnect, and move to the next affected rack, the wireless connectivity allows the administrator a new level of mobility within the server rack environment.

The embodiment of FIG. 7 requires only one channel for wireless communication 75 between the management station 79 and the digital switch 74. If the mouse/keyboard/video lag issue were not relevant, such a communication channel would be relatively simple to implement using existing 802.11 wireless standards. But, a pure replacement of wire-line from management station 79 to the digital switch 74 by an 802.11 wireless transmitter/receiver combination will not provide satisfactory performance. Instead, the example embodiment, the digital switch 74 includes a code device that implements a video compression such as the Dambrackas algorithm.

Figure 10:
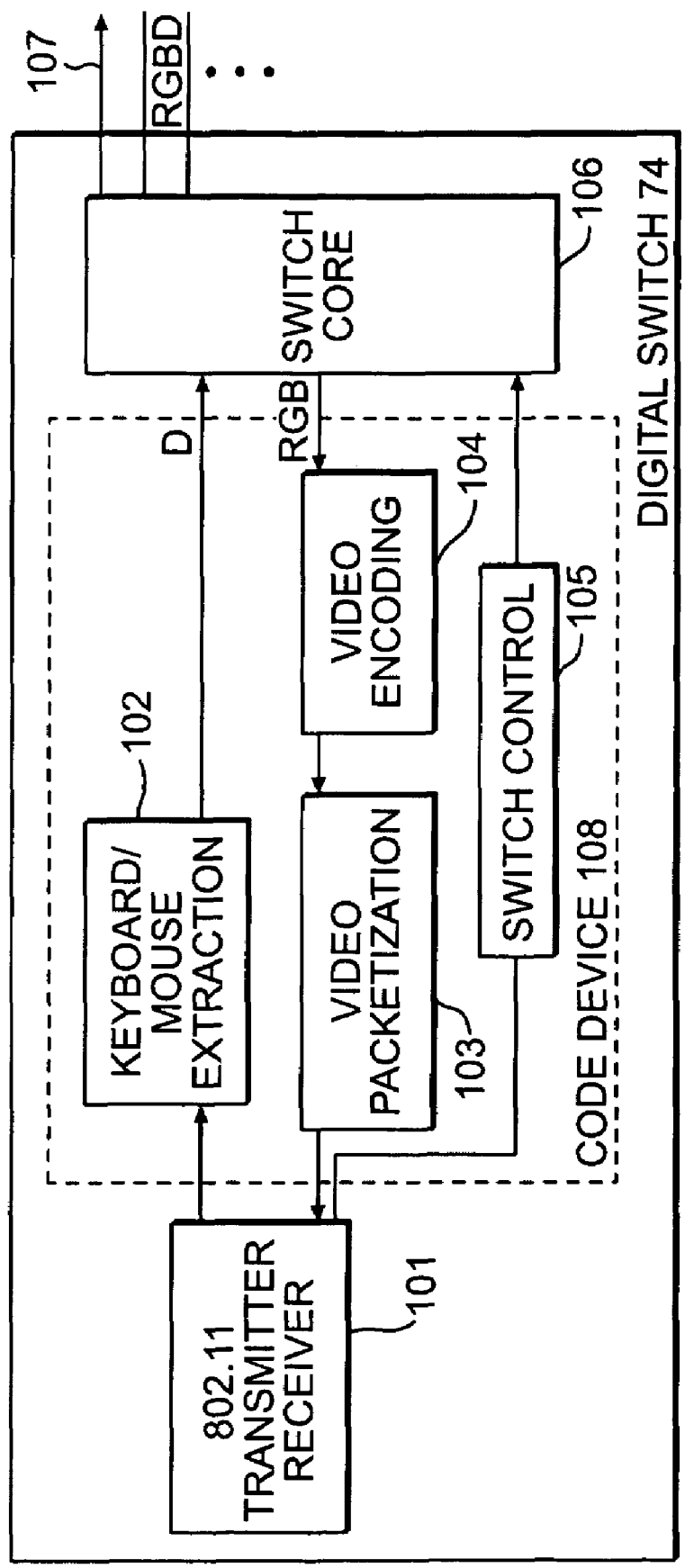
FIG. 10 is a schematic diagram of an example embodiment of a wireless crash cart equipped KVM switch.

As shown in FIG. 10, for example, digital switch 74 is shown with 802.11 wireless transmitter/receiver 101 communicating with the crash-cart type management station 79. 802.11 wireless transmitter/receiver 101 receives keyboard/mouse information from the management station 79, where it is extracted from the data stream by keyboard/mouse extractor 102. Keyboard/mouse extractor provides the keyboard/mouse information to the switch core 106, which selects a cable 107 on which to put to the keyboard/mouse information as a data signal D. Switch core 106 operates under the control of switch controller 105, which sets the switch core based on, for example, header information or control information in the data stream from/to the transmitter/receiver 101. The switch core 106 communicates with cables 107, which may be CAT 5 cable to provide red, green, and blue (RGB) video signals together with data (D) signals on a number of twisted pairs to servers coupled to corresponding ones of the CAT 5 cables. The servers receive the keyboard/mouse information (D) and return responsive computer video data (RGB) to the switch core 106. The video encoding routine receives the serial stream of RGB information from the switch and encodes it according to the Dambrackas algorithm. The video is then packeted by the video packetizer 103 and provided to the 802.11 transmitter/receiver 101 for wireless communication to the management station 79.

As described above, the different 802.11 standards provide different bandwidth capabilities and different protocol characteristics. Using 802.11(a) or (g), a bandwidth of 54 Mbps is obtained. With an example extremely low video resolution of about 1 million pixels per frame and a refresh rate of 60 frames per second, each raw RGB color component received by the video encoder 104 would amount to about 60 million pixels per second. With eight-bit color, the bandwidth requirement is about 500 Mbps for one extremely low resolution raw color component. Needless to say, the 802.11 standards do not provide for nearly that bandwidth. Lossy compression algorithms such as JPEG, MPEG, large block encoding, etc. can reduce the bandwidth requirement to workable levels, but the loss in video quality is noticeable. The Dambrackas algorithm described in the Background section above is one example of a lossless video compression routine that, for the first time, brings the wireless bandwidth provisions of, for example, 22 Mbps in 802.11b or 54 Mbps in 802.11a/g (FIG. 1) into operational range.

In embodiment of FIG. 8, the management station 79 is wired to the network 77 and to the digital switch 81. Wireless communication 80 via an 802.11 standard occurs between the digital switch 81 and the server racks 71 and 72. In this example, the digital switch 81 is equipped with a wireless card and a controller providing channelization control over communications with the various servers 73 et al in the racks 71 and 72. Because the switch 81 may be simultaneously, or essentially simultaneously, communicating with various ones of the servers in the racks 71 and 72, channelization control directs the wireless communications between the servers 73 et al and the digital switch 81 to avoid interference.

Figure 11:
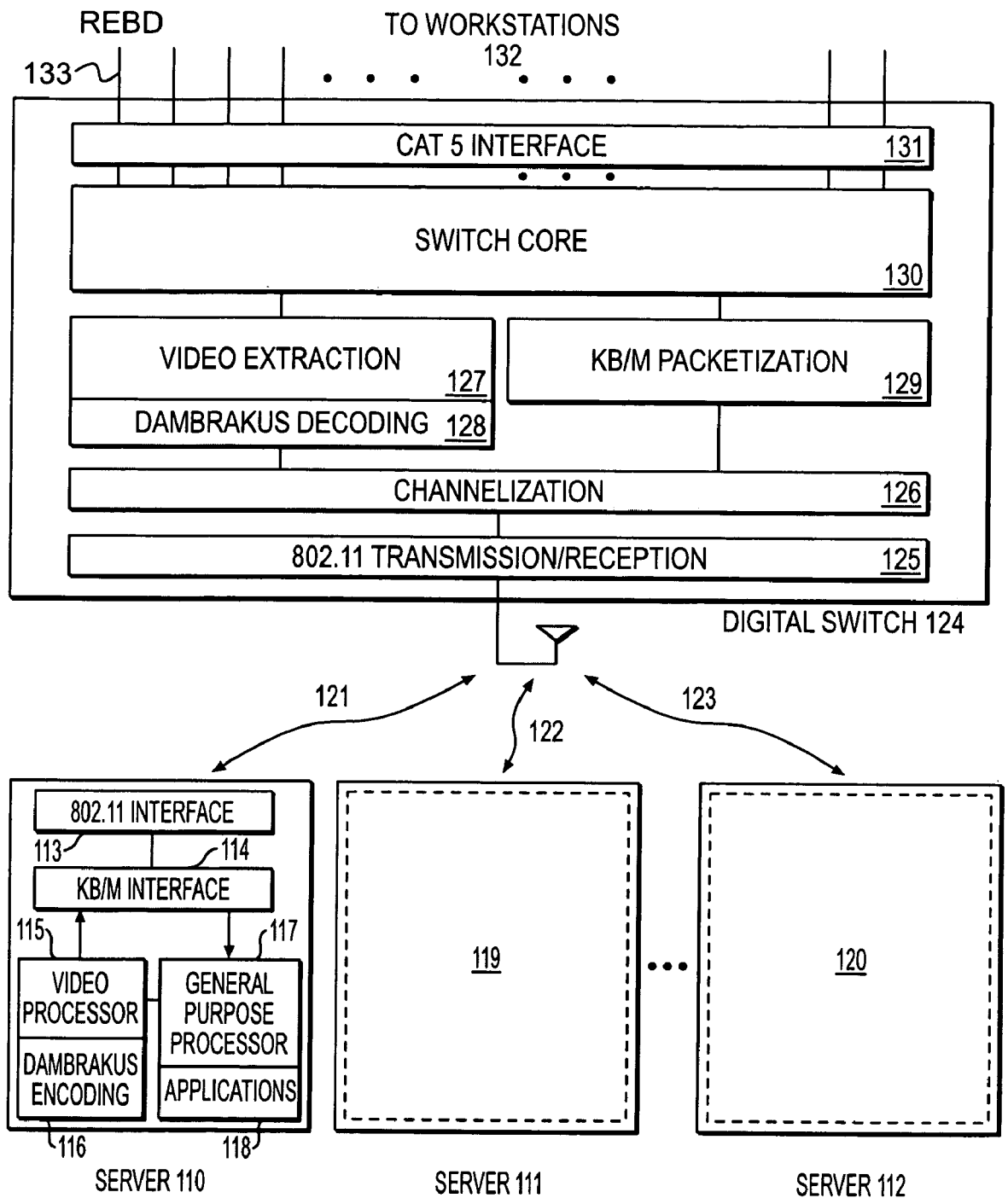
FIG. 11 is an example embodiment of an end-to-end wireless KVM solution.

FIG. 11 illustrates a more detailed example structure of a digital switch 124 communicating wirelessly to several servers 110, 111, 112, etc. Server 110 includes an 802.11 interface (transmitter/receiver) 113 that communicates via a channel 121 with the digital switch 124. 802.11 interface 113 communicates the data received on channel 121 to KVM interface (which may be part of a general purpose processor discussed below, or may be an independent integrated circuit). The KVM interface 114 removes the keyboard/mouse information and provides it to the general-purpose processor 117 for use in the application 118 being used by the workstation user. The resultant video from the application 118 is processed in a video processor 115 (or in some cases in the general purpose processor, without a separate video processor) into a serial data stream, and is then encoded according to the Dambrackas video encoding routine 116 described above. The encoded video is communicated back through the KVM interface 114, through the wireless interface 113, and through channel 121 to the digital switch 124.

The digital switch 124 receives the encoded wireless video signals at the 802.11 transmitter/receiver 125, through the channelization routine 126 to identify the server source (in this example, server 110), through the video extractor 127, where the packetization is removed and the Dambrackas video encoding is decoded by decoder routine 128. The extracted raw video is then switched through switch core 130 and onto a CAT 5 cable 133 connected to a selected workstation 132. At the CAT 5 cable, the information may be analog or digital RGB and may be on separated on different twisted pairs of the CAT 5 or may be modulated onto one or more twisted pairs.

Once the workstation receives the video on the cable 133, the workstation processes and displays the video on the monitor. The user responds to the new video by pressing responsive keys on the keyboard or moving the mouse responsively. That results in keyboard/mouse inputs being sent back down the CAT 5 cable 133 to the digital switch 124. The switch 124 receives the data at CAT 5 interface 131, switches it through switch core 130 to the keyboard/mouse packetizer 129, where it is packeted for transmission to the server 110. The packeted keyboard/mouse information is assigned to a particular channel 121 by channelizer 126 and sent to the server 110 by the 802.11 transmitter/receiver 125 via wireless channel 121. The server 110 receives the keyboard/mouse signals at 802.11 interface 113, keyboard/mouse interface 114, and general purpose processor 117, where new video is again prepared in accordance with the application programs 118. The process then continues between the workstation providing user inputs and the server providing responsive video.

The workstation 132 may communicate with any of the servers 110, 111, 112, etc. in a server rack. For sake of brevity, only three servers are shown in FIG. 11, but more can, and usually are, present. The internal features 119 and 120 of the servers 111 and 112, respectively, are identical to the features shown in server 110, except that the 802.11 interfaces for each server respond to a different channel call.

In general, channelization refers any one or more characteristic or use of a channel in a particular RF transmission scheme. In some specific applications, channelization refers to the number of channels in a transmission scheme, the center frequency of each channel, and the frequency "width" of each channel; whether each channel is dedicated or time-shared (e.g., TDMA); whether a channel is dedicated to carrying particular data or is used as a reference signal; how the channels are allocated among devices seeking to transmit information; whether a channel contains sub-carriers and the allocation and use of the sub-carriers; and whether information is transmitted on a single channel or sub-carrier or whether frequency hopping is used to transmit the information.

Because of the number of transmitters located in a single rack (i.e., the number of servers or blade servers each transmitting to the KVM switch), it is important to have a large number of channels available. Ideally, each server will have its own channel assigned to it. Alternatively, there may be more servers than there are available channels. In this situation, communication between the servers and the KVM switches may be multiplexed on the available channels. Alternatively, only a limited number of servers may be able to communicate with the KVM switches at a given moment, where the number of servers is limited to the number of available channels.

FIG. 9 illustrates another example wireless system which is wireless from workstation end to server end. In FIG. 9, the client management station 79 communicates signals 91 wirelessly via KVM access point 76 to wireless private area network manager 93. Also, private area manager 93 coordinates KVM data transfer via wireless signals 90 to the selected servers 73 et al in the racks 71 and 72, such that the management station 79 communicates wirelessly all the way through to the selected server and vice versa.

FIGS. 12 and 13 illustrate another example embodiment of an end-to-end wireless solution with additional structural detail. In FIG. 12, client 226 communicates wirelessly with the rack 201 via wireless access point 202. The wireless access point 202 also communicates wirelessly with the plurality of servers 203 in the rack 201, so the client 226 obtains total KVM control of the selected server, wirelessly from end to end. The clients 226 communicate with the access point 202 via local wireless access point 225 and network 204.

In FIG. 13, details of the structures of an end-to-end solution are further developed. Server 203 includes a standard pc (or other type) server 204 that may be running a, for example, a Windows or other operating system. The server 203 communicates with an analog KVM block 205, which represents keyboard, video (analog) and mouse signals emitted from the server 203. A/D processor 206 provides aid conversion for the video signals form server 204, video scaling, frame rate conversion, and other appropriate video processing are performed in processor 206 to allow for a variety of analog KVM signals to be translated into digital signals. Dambrackas video compression engine 207 encodes the video using the Dambrackas algorithm. The engine 207 can be an FPGA or a small footprint, low cost ASIC. The engine 207 transmits the encoded video to the processor 208. Processor 208 packets and conditions the signals for transmission on PCI bus 209. Using the processor 208 allows Ethernet mac and phy functions to be moved external to the processor 208 to add flexibility to the platform. The processor 208 delivers the packeted signals the PCI bus, which is added to enable multiple communications interfaces to be used. The transmission medium, such as Ethernet port 210, 802.11 wireless interface 211, or other medium 223, is coupled to the PCI bus for transmission of the packeted information to the client 200 via the wireless access point 202. The wireless interface 211 can be an IEEE 802.11b block that may be a standard, off-the-shelf WiFi wireless LAN radio. Alternatively, or in addition, the interface 211 can support 802.11a or other wireless transmission protocols capable of transmitting the encoded KVM signals at an adequately responsive rate.

The video signals from server 203 communicate wirelessly to the wireless access point 202. The wireless access point 202 can be in the rack 201 (as shown in FIG. 12), or proximate the rack for wireless communication to the servers. Access point 202 switches and manages the wireless KVM traffic between the server 203 and the client 226. It includes an optional wireless rack security block 212 that inhibits unauthorized receipt of the KVM signals by wireless coupling. One method of adding such security is to attenuate the signals transmitted from the wireless access point 202 to the servers so they will only travel a few meters—enough to reach the commonly racked servers, but not so much that the signals receptively extend substantially beyond the physical server space.

Coupled to the security block 212 in the wireless access point 203 is the wireless radio manager 213. The radio manager 213 is where channelization and bandwidth for the wireless signals to the various servers is managed. In the manager, radios at the servers are effectively switched on and off as KVM access is switched from server to server. The concept provides additional security and optimization of bandwidth of a client's connection. The manager 213 connects to a selected transmission medium (for example, 10/100 media 215 and Gigabit Ethernet 216) via a network interface selector 214. The interface selector represents the back end connection to the network. In the preferred embodiment, multiple interfaces support multiple radio connections. Using 802.11a in a special 108 Mbs mode across four non-overlapping channels could demand over 400 Mbps. Thus, additional alternative connections to the backbone network are also provided. Finally, a local access block 217 may be provided to have a point-to-point local rack access to the system that bypasses any data network. This gives the system administrator 200 emergency access to any server within the rack to which the access point is connected.

With wired access, the access point 202 communicates with wired network interface 219 on the network 204 (from the client 226). The wired network interface 219 is the network connection of the client and is likely to be a standard 10/100 Ethernet or other suitable network interface. Wireless access is provided for the client 226 via local access point 225 and the network cloud 204. The wireless access point 225 and network 204 provide the client mobility and flexibility. Again, WiFi devices can be used for the connection between wireless client 226 and wireless access point 225. The network 204 communicates by network connection to the access point access point 202 at block 215 or 216. The client 226 thus sends KM data and receives video data to/from the access point 202 via the network 204 and wireless access point 225. The video received by the client is applied to a software routine 223 running on at the client computer 222 of the client 226. The software routine includes a decompression block (similar to the Dambrackas engine), which decompresses the video data that had been compressed by the DVC compression engine 207. KVM output block 221 represents the raw keyboard, video and mouse data from/to the client 222.

Figure 14:
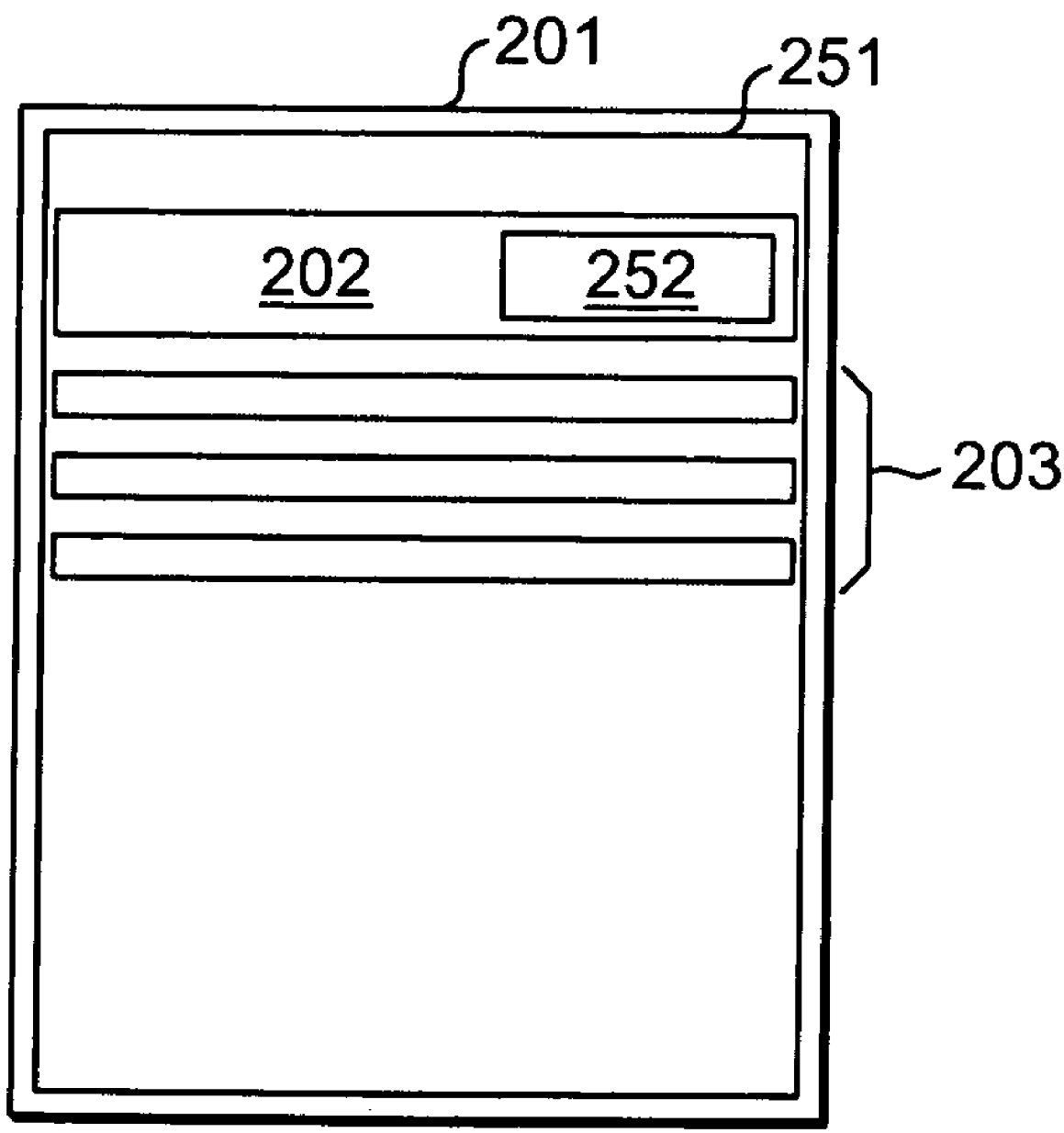
FIG. 14 is a schematic representation of a security-enhanced wireless server rack.
Figure 15:
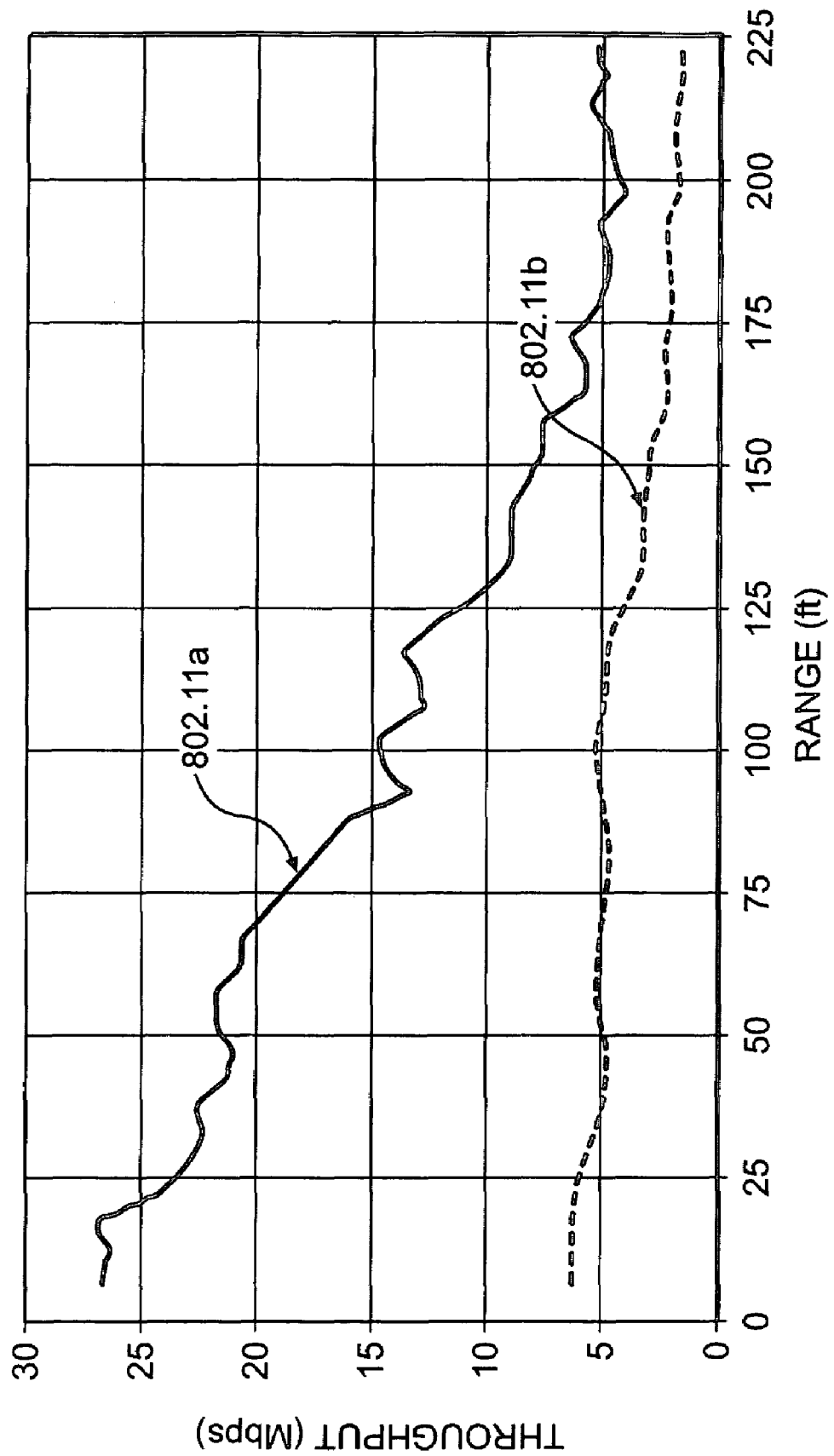
FIG. 15 is a chart showing 802.11 throughput characteristics.

FIG. 14 illustrates an optional alternative to the wireless server rack, in which security features are enhanced. One concern affecting the acceptance of wireless KVM solutions is the possibility of wireless coupling of transmitted KVM signals by unauthorized users. In the embodiment of FIG. 14, channeling the wireless KVM signals, as described above, provides a first level of security. Channeling by spread spectrum, code division, or other such process provides some security against all but the most sophisticated unauthorized users. To provide additional security, the digital switch 202 (of, for example, FIGS. 12 and 13) further includes attenuator 252 to reduce the 802.11 signal to a receptive distance (a distance in which modem receivers can recover the signal over the noise). As shown in FIG. 1, 802.11b and 802.11g transmissions have a typical range of 50 meters, while 802.11a transmissions have a typical range of 20 meters. Additionally, FIG. 15 shows that 802.11b has a significantly higher throughput across the available range. By attenuating the wireless signal to a typical range of 10 meters or less, the wireless signals from the digital switch 202 to the respective servers 203 can be contained. For example, in a very large server rack of perhaps 4 or 5 meters in height and 5-7 meters in width, attenuating the wireless signal to less than 10 meters will ensure that a rather centrally located (in the rack) digital switch 202 can wirelessly communicate with any of the servers in the very large rack. But, beyond the 10 meters, unauthorized users could not remove the KVM signals from the ambient noise levels.

To further enhance security, the digital switch 202 and servers 203 in the rack 201 can be wrapped by an RF shield 251. With radio manager 213 channeling by spread spectrum or other technique, attenuator 252 reducing 802.11 signal range, and shield 251 containing attenuated signal to the rack 201, security over the KVM signals is well-established.

In another aspect of the system shown in FIG. 14, the communications between digital switch 202 and servers 203 are accomplished using ultra wide band wireless (UWB) communications protocols. UWB is a known protocol, the specifications for which are directed by the FCC. In essence, the UWB protocol permits transmitters to use portions of spectrum that are use-restricted—provided that the signal level remains below a noise-floor determined by the FCC. Using spread spectrum techniques, the UWB signals can be reliably recovered short distances (up to about 10 meters) away. The inventors have recognized that the characteristics of UWB have excellent application in the rack-oriented server environment to eliminate wires. Until now, use of UWB in the rack environment had not been recognized even though UWB would allow for both increased data transmission and improved security, while reducing the number of cables because it offers much more spatial capacity and channelization than narrowband radio technology. FIG. 16 illustrates that the wireless signal will not need to be attenuated, as discussed above with respect to the 802.11 signal in FIG. 14, because UVB signals only travel about 10 meters. Therefore, unauthorized users from outside this area will be prevented from removing the KVM signals from the ambient noise levels. The short duration of UWB signal bursts and the fact that UWB signals travel over multiple frequencies both also act to prevent unauthorized decoding and access.

Figure 17:
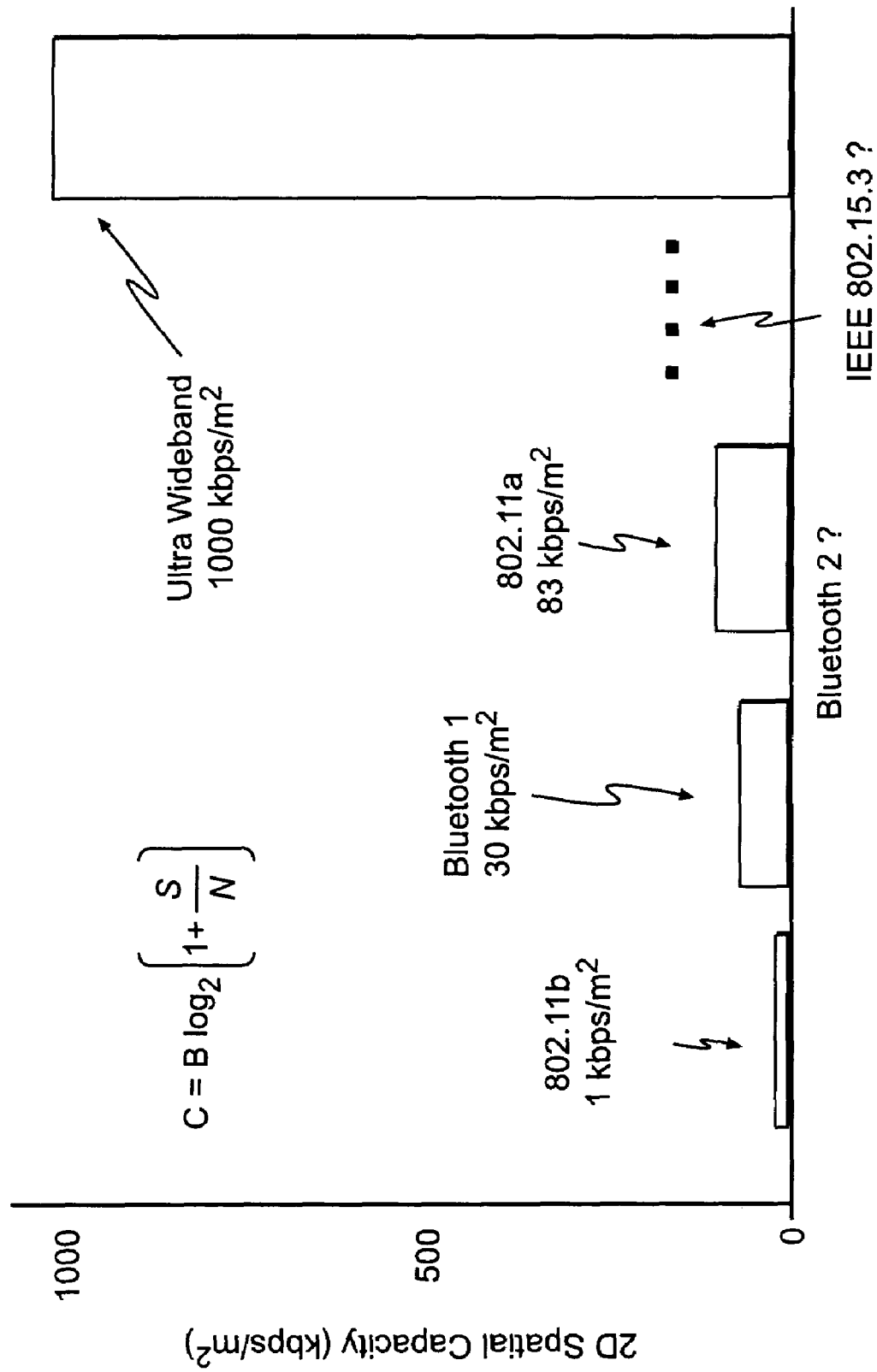
FIG. 17 is a chart showing the two-dimensional spatial capacity of four different types of radio transmission methods

The use of UWB would also lessen the number of cables connected to the digital switch and the servers and enhance the data transfer rate. In replacing all of the cables between the servers and the KVM switch, there will be a large radio density. FIG. 17 shows that UWB offers greater spatial capacity and channelization than narrowband radio technology. Therefore, the WLAN will be able to support more users in smaller spaces, but with higher bandwidths.

The UWB feature can be incorporated, for example into the example embodiment of FIG. 11. Each server 110, 111, 112, etc. can incorporate a UWB transmitter for element 113 to transmit keyboard/mouse and video signals to/from the switch 124 in the rack (or another rack). The UWB channel utilized by the transmitter element 113 is provided by the channelization controller 126 in the switch 124. If each server receives a different UWB channel, they can simultaneously talk to the switch 124 so workstation (132) users of the servers (through the switch 124) can communicate with respective server essentially without time delay (that may be caused by, for example, a time division communication protocol rather than the UWB protocol).

In that example embodiment, interface 113 utilizes the low power UWB signals to communicate with the receiver 125 such that the signals can only realistically be recovered within about 10 meters.

In alternative UWB examples, the UWB features are used by the server 110, 111, 112, etc. to communicate with each other rather than, or in addition to, communicating with the switch 124.

In another alternative embodiment, the UWB signals are attenuated even beyond their FCC-mandated low-level so the distance of feasible recovery is less than 10 meters. In one such example, the attenuation is provided to limit signal recovery distances to slightly more than the maximum physical distance between the switch 124 and the furthest server in the same rack.

The UWB transmission features can be used in conjunction with the other wireless embodiments described herein, as well as with any of the protocols described (such as, for example the Dambrackas Video Compression).

The above-described embodiments demonstrate the ability to connect wirelessly to multiple servers in a rack environment. The wirelessly connectivity solution is realized by incorporation of a video compression algorithm that takes advantage of the unique compressibility characteristics of computer video, such as (by way of example), the Dambrackas video compression algorithm or modifications thereto. Compression and digital conversion of KVM traffic will take place as the server either integrated into the server or externally performed in a small USB2 dongle 250 hanging off of each server. In the larger scale systems, the digital switch controls wireless signal channeling to/from the various servers in the rack. Added functionality, including security, environmental monitoring, and asset management can also be given to the wireless switch.

The invention claimed is:

1. A computing system, comprising:
    a sewer rack defining card slot locations to receive electronic cards;
        one or more sewers located on corresponding ones of the electronic cards and physically interacting with corresponding ones of the slot locations, each said server configured to receive user command data, having a corresponding wireless radio, being programmed to process the user command data according to application programs operating on said server, and producing a video response resulting from said processing of the command data according to the application programs; each said server also including a code device to digitize and encode the video response into essentially lossless digital computer video information;
        a digital switch in the server rack, including a wireless server port to simultaneously communicate with the wireless radios of two or more of the servers and a second port to receive keyboard input information, said digital switch communicating the keyboard input information as the user command data directed to a selected server and receiving an analog signal identifying the video response from the selected server; and a management station creating via user inputs the keyboard input information and communicating said keyboard input information to the digital switch.

2. A computing system according to claim 1, wherein the management station is a laptop computer.

3. A computing system according to claim 1, wherein the wireless server port and the wireless radios operate according to an 802.11 wireless communication standard.

4. A computing system according to claim 1, wherein the wireless server port and the wireless radios operate according to an ultra wideband wireless communication standard.

5. A computing system according to claim 1, wherein the video encoding includes a combination of run-length encoding and binary bit-coordinated encoding of two-color pixel strings.

6. A server rack, comprising:

a plurality of server cards each comprising a general processing code device, a memory device containing at least one application program, and a video processing code device, and a server card radio device, each said server card having a unique identifier associated with its server card radio device to distinguish its server card radio device from the radio devices of each other server card in the server rack, said server cards receiving keyboard input information, inputting the keyboard input information to the general processing code device, employing the application program in response to the keyboard input information, and producing in the video processing code device an encoded digital video signal in response to at least the application program; and a digital switch comprising a digital switch radio device in simultaneous radio communication with two or more of said server card radio devices, said digital switch radio device configured to communicate the keyboard input information to selected ones of the server card radio devices and to receive the encoded digital video signal from the selected ones of the server card radio devices, said digital switch comprising a radio manager to channel communications between the digital switch and the selected ones of the server card radio devices using the unique identifiers.

7. A server rack according to claim 6, wherein one or more members of a group consisting of the general processing code device, the video processing code device, and the server card radio device are physically located on a common integrated circuit.

8. A server rack according to claim 6, wherein the server card radio devices and the digital switch radio device operate according to an 802.11 wireless communication standard.

9. A server rack according to claim 6, wherein the server card radio devices and the digital switch radio device operate according to an ultra wideband wireless communication standard.

10. A computing system according to claim 6, wherein the video processing code device producing the encoded digital video signal video includes an encoding routine employing a combination of run-length encoding and binary bit-coordinated encoding of two-color pixel strings.

11. A server rack according to claim 6, wherein the radio manager channels communications between the digital switch and the selected ones of the server card radio devices by directed selected ones of said communications identified by the unique identifiers to pre-established wireless communication channels.

12. A system, comprising:

a plurality of servers in a common rack, each comprising a code device, an application program responsive to user inputs to produce computer video, and a server radio having a unique channeling identifier relative to the other servers in the common rack;

a digital switch comprising a digital switch radio device in simultaneous radio communication with two or more of said server radios, said digital switch radio device configured to communicate a given user input signal to a selected one of the server radios and to receive from the selected one of the server radios an encoded digital video signal, said digital switch comprising a radio manager to channel communications between the digital switch and the selected one of the server radios using the unique identifiers;

a workstation wireless access point communicating with a user workstation providing the user input signals, said wireless access point including an access point radio communicating with a network in communication with the digital switch.

13. A system according to claim 12, further including a private wireless network manager receiving the user input signals from the network via a wireless communication link, wherein the digital switch radio device communicates the encoded digital video signal to the network via wireless communication for further communication to the user workstation.

14. A system according to claim 12, wherein the digital switch further includes a channeling interface to channel corresponding user input signals wirelessly to corresponding ones of the servers in accordance with a wireless communication protocol.

15. A system according to claim 12, wherein the digital switch further includes a channeling interface to channel corresponding encoded video signals wirelessly from corresponding ones of the servers to the digital switch.

16. A system according to claim 12, wherein the radio communication between the digital switch radio device and said server radios is attenuated to limit receptive range to less than 10 meters.

17. A system according to claim 12, wherein the radio communication between the digital switch radio device and said server radios operate according to an ultra wideband wireless communication standard.

18. A system according to claim 12, wherein the common rack further includes an RF shield exterior of the plurality of the servers and exterior of the digital switch.

19. A system according to claim 12, wherein the digital switch includes a video decoding engine to create a decoded video signal from the encoded video signal.

* * * * *